United States Patent
Ihle et al.

(10) Patent No.: US 7,573,169 B2
(45) Date of Patent: Aug. 11, 2009

(54) PERMANENT MAGNET ROTOR

(75) Inventors: Olai Ihle, Eckental (DE); Thomas Peterreins, Nuremberg (DE); Helmut Schmidt, Fuerth (DE); Armin Suttner-Reimann, Schwabach (DE)

(73) Assignee: Buehler Motor GmbH, Nuremberg (DE)

( * ) Notice: Subject to any disclaimer, the term of this patent is extended or adjusted under 35 U.S.C. 154(b) by 31 days.

(21) Appl. No.: 11/790,815

(22) Filed: Apr. 27, 2007

(65) Prior Publication Data

US 2007/0284952 A1    Dec. 13, 2007

(30) Foreign Application Priority Data

Apr. 28, 2006    (DE) .................. 10 2006 021 244

(51) Int. Cl.
*H02K 21/12*    (2006.01)

(52) U.S. Cl. ............................. 310/156.21; 310/43

(58) Field of Classification Search ............ 310/156.08, 310/43, 54, 156.21, 156.23, 156.8, 90
See application file for complete search history.

(56) References Cited

U.S. PATENT DOCUMENTS

| | | | | |
|---|---|---|---|---|
| 5,734,216 | A * | 3/1998 | Yamada et al. | 310/156.21 |
| 5,930,071 | A | 7/1999 | Back | |
| 7,420,312 | B2 * | 9/2008 | Kitamura et al. | 310/263 |
| 2004/0045154 | A1 | 3/2004 | Kojima et al. | |

FOREIGN PATENT DOCUMENTS

| | | | |
|---|---|---|---|
| DE | 2328886 | | 1/1975 |
| FR | 2542519 | | 9/1984 |
| JP | 6086485 A | * | 3/1994 |
| JP | 7075269 A | * | 3/1995 |
| JP | 8065932 A | * | 3/1996 |
| JP | 2001268831 A | * | 9/2001 |
| WO | WO 99/12248 | | 3/1999 |

OTHER PUBLICATIONS

Patent Abstracts of Japan, Magnet Rotor; Publication No. 56157249 A, Publication Date: Dec. 4, 1981.

* cited by examiner

*Primary Examiner*—Michael C Zarroli
(74) *Attorney, Agent, or Firm*—Jacobson Holman PLLC

(57) ABSTRACT

A permanent magnet rotor having a shaft, a hollow cylindrical permanent magnet and an elastic connecting medium between the shaft and the permanent magnet. The permanent magnet is arranged co-axially around the shaft to ensure that the permanent magnet is mounted securely, that it is not damaged during large temperature fluctuations, and that it is not deflected impermissibly from the axis of rotation in case of heavy radial load. A simple installation process uses a mechanical connection between the shaft and the permanent magnet. This task is performed by virtue of the fact that an elastic connecting medium is arranged along the periphery of the shaft at several first areas in which the distance between the shaft and the permanent magnet is enlarged. These first areas are separated from the second areas in which the distance between the shaft and the permanent magnet is minimized but not zero.

18 Claims, 3 Drawing Sheets

PERMANENT MAGNET ROTOR

BACKGROUND OF THE INVENTION (1) Field of the Invention

The invention is related to a permanent magnet rotor with a shaft, a hollow cylindrical permanent magnet and an elastic connecting medium between the shaft and the permanent magnet, with the permanent magnet arranged coaxially around the shaft.

(2) Description of Related Art

A generic permanent magnet rotor is known from DE 23 28 886. In this design, a hollow cylindrical permanent magnet is mounted with the help of an elastic intermediate layer. The radial thickness of the elastic intermediate layer is measured in such a way that in case of sudden braking of the motor shaft, the permanent magnet can swing in the direction of the periphery, and thus prevent damage to the gear pinion. Other applications in which there are large temperature fluctuations, elastic intermediate layers help prevent mechanical tensions between materials subject to different degrees of heat expansion. However, it is this elastic intermediate layer that prevents a reliable permanent mechanical connection between the shaft and the permanent magnet. Another disadvantage is that the precision of the circular motion cannot be adequate in case of radial load, because the elastic material is of a yielding variety. Moreover, the material should not swell under the influence of humidity. Swelling could lead to the bursting of the permanent magnet.

BRIEF SUMMARY OF THE INVENTION

The task of the invention is to ensure that the permanent magnet is mounted securely, that it is not damaged under large temperature fluctuations, and that it is not deflected to an impermissible extent from the rotary axis. A simple and cost-effective assembly method is used in which a secure mechanical connection between the shaft and the permanent magnet is guaranteed over the entire life of the device.

According to the invention, this problem is solved by arranging the elastic connecting medium on the periphery of the shaft in several first areas in which the distance between the shaft and the permanent magnet is enlarged, and they are separated from the second areas in which the distance between the shaft and the permanent magnet is minimum, but not zero. The areas having larger distance provide secure support to the elastic connecting medium, and the areas with less distance allow only a limited deflection of the permanent magnet with reference to the shaft or a component surrounding the permanent magnet. This increases the precision of the circular motion even under conditions of heavy radial load. The areas with less distance can absorb the volume changes occurring in the elastic connecting medium to a certain extent during assembly or on account of temperature of pressure loads, and thus avoid tensions in the magnet material. Here and in the following pages, shaft also means a rotor body that is integrated with the pump impeller into one single unit, which carries the permanent magnet. The elastic connecting medium is preferably an elastic adhesive. The adhesive creates a compact connection between the shaft and the permanent magnet, which guarantees a stable inner connection between the two components. Silicon was found to be an ideal adhesive with adequate elastic properties. RTV-1 Silicon rubber variants of the ELASTOSIL® series are also suitable, which react to the humidity in the air as an elastic Silicon rubber (RTV-1=Room Temperature Wetting, 1-Component).

To implement a preferred embodiment of the invention, it is recommended that the elastic connecting medium be arranged in several grooves parallel to the axle. It is also recommended that the number of grooves should not be equal to half the number of poles or the total number of poles of the permanent magnet. Further, the number of grooves should not be equal to the number of wings of the impeller. These measures minimize the noise buildup. To establish a stable connection, the number of grooves should be equal to or more than three, the preferred number being three. The grooves should be distributed at uniform distances on the periphery of the shaft, so that an exact centering of the shaft can be achieved with reference to the permanent magnet. "Wings" have the same meaning as "vanes."

Instead of using straight grooves, the elastic connecting medium can be arranged in meander-shaped or spiral-shaped grooves around the shaft. There can be one or several grooves. What is crucial is that the elastic connecting medium is not applied on the full surface, and that no air cushions are formed.

To be able to establish a maximum possible robust and mechanically stable connection, the elastic connecting medium should be distributed across the entire length of the permanent magnet. In principle, the recommended magnet mounting can be used in all permanent magnet materials. Ferrite magnets are particularly ideal for this type of connection, because Ferrites are very brittle and prone to ruptures, particularly under thermal and other mechanical tensions.

For a large number of applications, it is cost-effective to produce the shaft from plastic material that can be processed through injection molding. The suggested geometry of the shaft is suitable for this production process, especially on account of the missing undercuts that would have been unavoidable if the grooves were arranged in cross-section. It is recommended that the shaft be designed as hollow, and that it be mounted on an axle so that it can rotate.

The dimensioning of the two different areas is selected in such a way that an undesirably large deflection of the permanent magnet with reference to the shaft or a component surrounding the permanent magnet at a very small distance can be ruled out. Electric engines/motors constitute the most frequent application of the invention in question. In this case, an undesirably large deflection with respect to a stator is ruled out. The ratio (L/A) of the air gap length (L) between the permanent magnet rotor and the stator, and the minimum distance (A) of the second area between the shaft and the permanent magnet is to be selected as more than 1. This way the permanent magnet can be deflected only within the allowed limits. The permanent magnet rotor has a locating bearing that is fixed permanently to the axle or rotor. Normally, the locating bearing is fixed to the rotor so that the bearing surface may have a low friction radius.

In a preferred embodiment, the locating bearing is made of a plastic material that can be processed through injection molding and is joined to the permanent magnet rotor through original forms. The bearing material in this case is connected to the permanent magnet rotor through injection molding, insertion molding or tagged molding. If it is necessary to use a special bearing material that should not be used for the permanent magnet rotor for technical or economic reasons, one can use different plastic materials adapted to the concerned objective.

If these aspects are only of subordinate importance, one can also use the same plastic material for permanent magnet rotor as well as locating bearing, and manufacture both in a single operation. It may be necessary to produce the locating bearing from a friction-proof plastic material or from a material having better sliding properties than the shaft material. Filling material such as graphite is ideal for improving sliding properties. Graphite is well-known as a solid lubricating agent.

While using different materials for locating the bearing and the shaft, one can use a two-component injection molding process in which the locating bearing and the shaft are manufactured one after the other in a single injection molding tool.

A special design of an electric motor contains a permanent magnet that has a second magnetization coordinating axially with a stator-proof magnet sensor in addition to a first magnetization with a radial magnetization cooperating with a stator magnetic field. The permanent magnet is designed as a one-piece unit.

Electric motors having a permanent magnet rotor according to the invention are ideal especially for use as pump drives, where the shaft works in tandem with a pump impeller. The shaft and the impeller should preferably be integrated in a single unit. Of course, it is known that the entire pump rotor, i.e., permanent magnet and pump impeller are manufactured from the same material and in one operation, but more permanent material is consumed in this way than is actually necessary. This also has an effect on the weight and the moment of inertia of the pump rotor. Further, it has been established that such one-piece pump rotors can burst under extreme temperature fluctuations, although the permanent material is plastic bound.

The mentioned temperature fluctuations occur frequently in wet running centrifugal pumps for cooling water pumps in the motor vehicles sector. Depending on the application in question, the cooling medium is also ideal for cooling the pump itself. The components to be cooled are the stator, particularly a stator coil or in case of electronically commutated DC motors—the integrated control circuit (IC) for switching the stator coil.

BRIEF DESCRIPTION OF THE DRAWINGS

A design example of the invention is explained in greater detail in the following pages with the help of the drawing. The following are available for viewing.

DETAILED DESCRIPTION OF THE INVENTION

Figure 1:
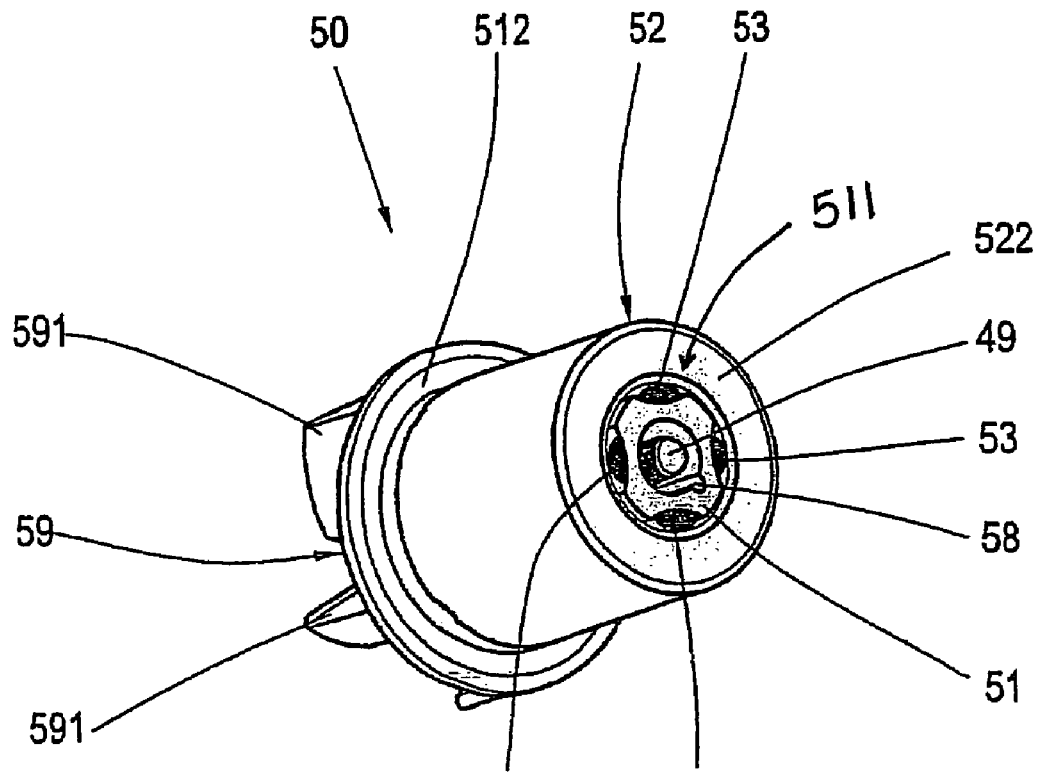
FIG. 1A perspective view of a rotor.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 illustrates a spatial representation of a rotor 50, which is mounted on an axle 49 through a locating bearing 54. The bearing is connected permanently to a shaft 51 designed as a hollow shaft. The outer periphery of the shaft 51 has four grooves 511 running parallel to the axle. An elastic connecting medium 53 is arranged in the grooves in such a way that it establishes a connection between the shaft 51 and a hollow cylindrical permanent magnet 52. The connecting medium here is an elastic adhesive, e.g., Silicon. The inner diameter of the permanent magnet 52 is slightly more than the maximum outer diameter of the shaft 51 in the area within the permanent magnet 52. The diameter difference is calculated in such a way that on the one hand excess adhesive can go into the gap between the shaft 51 and the permanent magnet 52 so that in case of external load, a small deviation of the permanent magnet 52 from the center is possible. However, this deviation is very limited. The adhesive medium is filled in the grooves with the help of hollow needles. The shaft 51 and the pump impeller 59 are integrated into one piece that has wings 591. The wings 591 spring out of a disk 512. The opposite side of the disk 512 serves as the supporting surface for the permanent magnet 52. A longitudinal groove 58 that is open to the bearing and axle 49 is provided on the inner side of the shaft. This groove serves as a secondary cooling channel.

Figure 2:
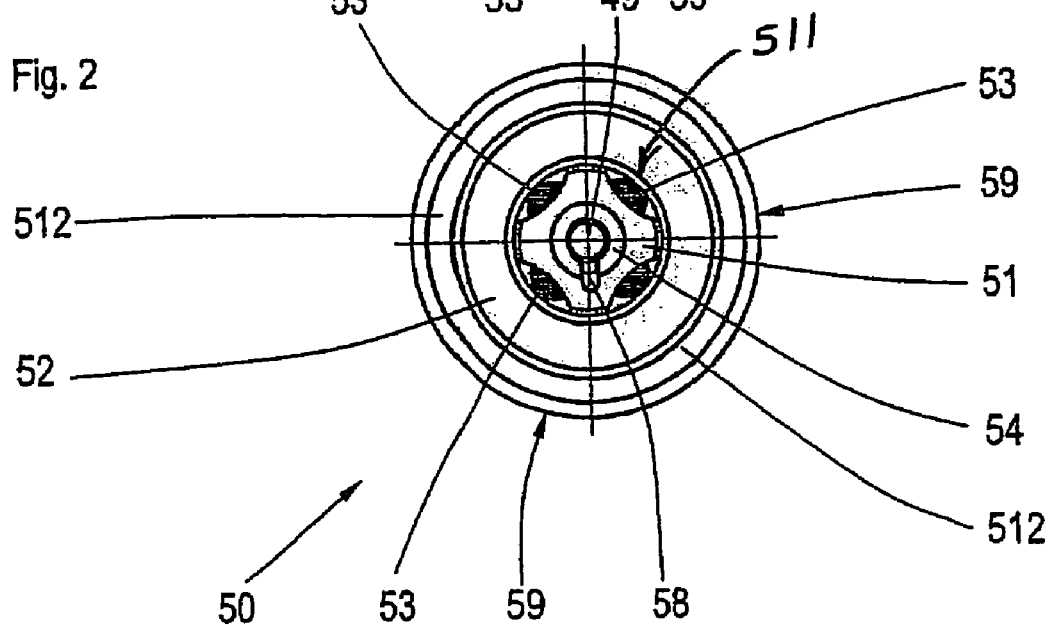
FIG. 2 A front view of the rotor.

FIG. 2 shows a front view of the permanent magnet rotor 50 according to the invention, with an axle 49 that is fixed in a pump housing. The locating bearing 54 and the shaft 51 are integrated with the pump impeller 59 into one piece. The pump impeller is integrated with the disk 512 that supports the permanent magnet 52.

Figure 3:
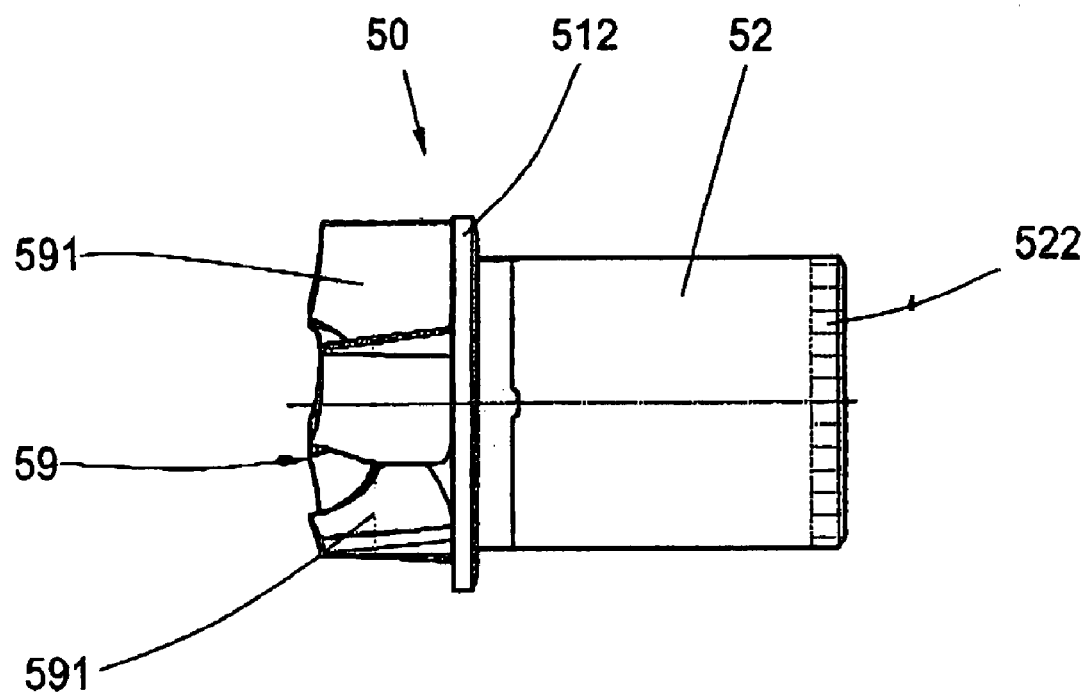
FIG. 3 A side view of the rotor.

FIG. 3 shows a side view of the permanent magnet rotor 50 according to the invention, along with the pump impeller 59, the wings 591, the disk 512 and the permanent magnet 52, where the permanent magnet has an axial sensor trace magnetization 522 with alternating poles in a front side area. The permanent magnet is preferably magnetized radially at the time of production. The axial sensor trace magnetization 522 takes place only after the magnetization of the permanent magnet 52.

Figure 4:
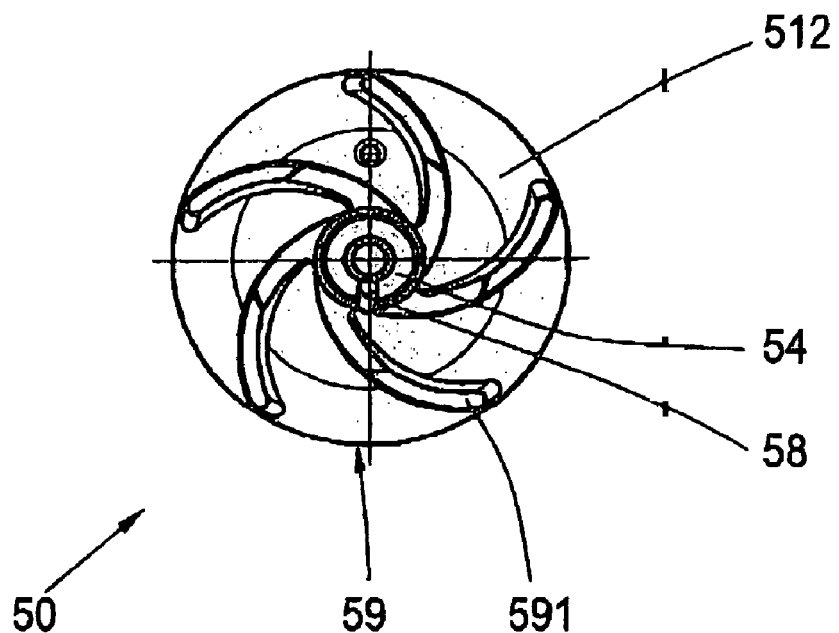
FIG. 4 A front view of a pump impeller.

FIG. 4 shows a front view of the pump impeller 59 with disk 512, the wings 591, the locating bearing 54 and the longitudinal groove 58.

Figure 5:
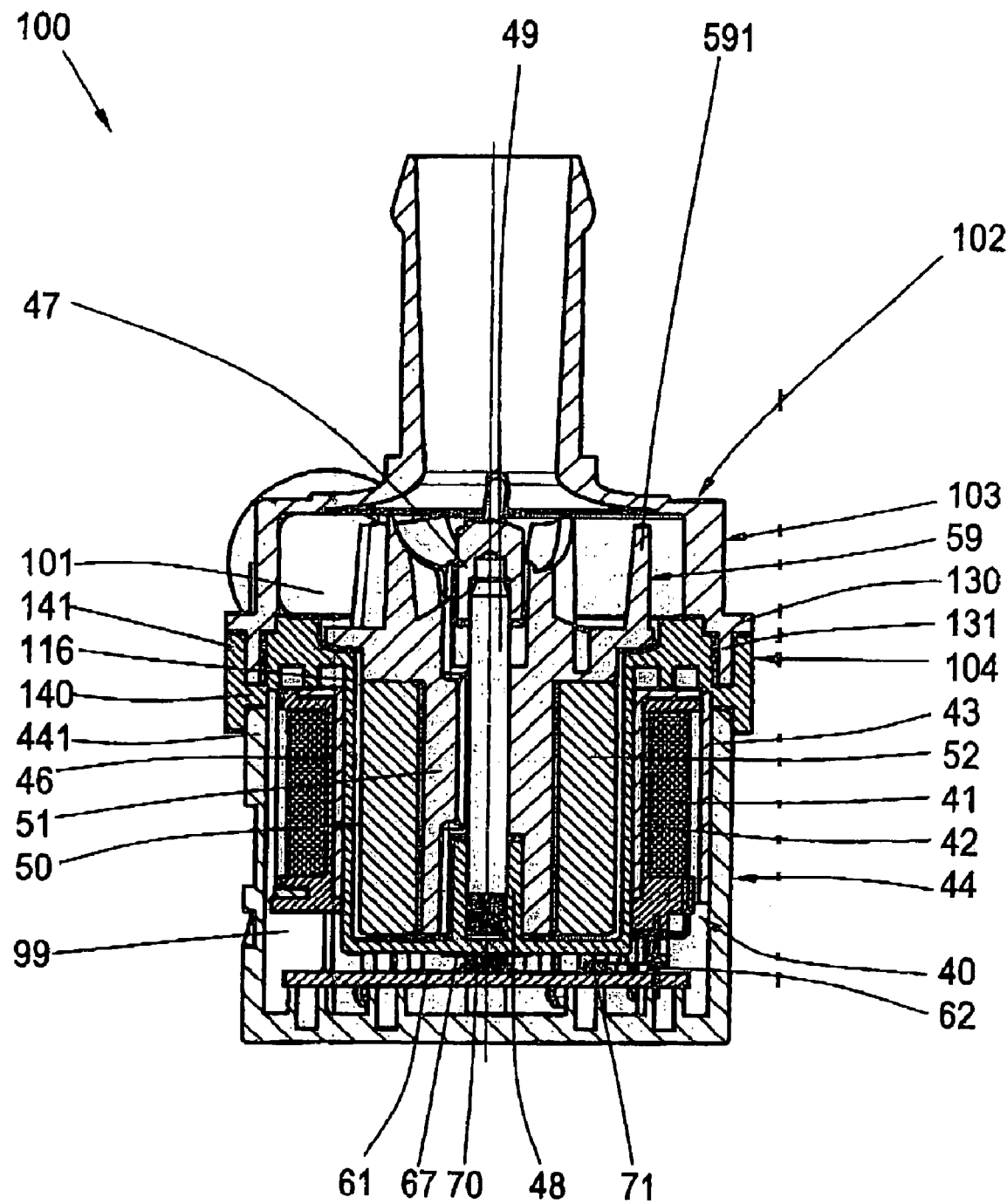
FIG. 5 An assembly drawing of a centrifugal pump.

FIG. 5 shows a sectional view of a centrifugal pump 100 according to the invention, with a pump housing 102 consisting of a first housing part 103 and a second housing part 104 attached to it. A motor housing part 44 limits a dry chamber which is occupied by a stator 40 of an electronically commutated DC motor and its activation electronics. The motor housing part 44 is connected to the second housing part 102. The first and the second housing parts 103, 104 limit a wet chamber 101 of the centrifugal pump. The second housing part 104 is integrated into one piece with a split case 116, which separates the wet chamber 101 from the dry chamber 99.

The wet chamber 101 contains an axle 49 which is installed permanently between a split case side axle support 48 and a suction nozzle side axle support 47. A bordering at the axle end prevents unintentional rotation of axle 49 when the pump is in operation. A locating bearing 54 (not shown here) is mounted on Axle 49 in such a way that it can rotate. It is pressed into a hollow shaft 51 of the rotor 50. The shaft 51 forms a single piece with a pump impeller 59 that contains several approximately spiral-shaped wings 591 for pumping the liquid. The front surfaces of the locating bearing 54 can be supported axially by an intermediate layer of start disks against the split case side axle support 48 and against the suction nozzle side axle support 47. A hollow cylindrical Ferrite magnet 52 is pasted on the hollow shaft 51. An elastic adhesive is used, which is guided into four or five grooves 511 (not shown here) formed in the hollow shaft parallel to the axle.

The dry chamber 99 contains the stator 40 of the electronically commutated DC motor 10 which is designed as a hollow cylindrical stator coil 41. Under operation, its magnetic field is guided alternately to the periphery of the split case 116 through the claw poles 42 and it interacts with the hollow cylindrical permanent magnet 52 in the wet chamber 101. The magnetic circuit is closed with the help of a return ring 43 that is connected to the claw poles 42. The claw poles 42 are provided with an insulating body 46 which connects the claw poles 42 to each other mechanically but not magnetically. In the current example, the stator 40 has four pole pairs.

The insulating body 46 is shaped geometrically in such a way that the coil wires of the stator coil 41 can be connected through contact pins 62 having clamping blade contacts. These clamping blade contacts can be mounted mechanically in the insulating body 46. The contact pins 62 are designed as combo-contacts and they are pressed into the circuit board 61 at the end opposite the clamping blade contact 63, and contacted with it in this way. The contact pins 62 contain one or two deformable pressing zones for this. The circuit board 61 contains a hall sensor 71, an integrated control 70 for switching the stator coil, a PTC for coil protection and male connector pins for the voltage supply. The motor housing part 44 contains a male connector housing (not shown here) in which the male connector pins 64 are arranged. Electronic components with large heat losses are heated with the help of heat conduction foils 67 from the wet chamber 101. Conductors that serve the purpose of contacting the elements to be cooled are dimensioned in such a way that maximum possible wide conductors 66 are provided for easier heat emission on the circuit board 61. To exploit the circuit board 61 well and to achieve optimal heat emission, the different conductors 66 have different widths, depending on how much heat is generated in the component connections to be contacted. A longitudinal groove is formed in the shaft 51 as cooling channel between a bottom 117 of the split case 116 and the pump impeller 59, which also forces a continuous circulation of the pumped medium even in the inner areas of the split case 116. The circuit board is arranged between the front side 45 of the motor housing 44 and the bottom 117 of the split case 116, and maintained in heat conducting contact with the bottom 117 over the heat conducting foil 67.

The first housing part 103 has a first flange 130 and a first ring 131 connected to it. The second housing part 104 has a second flange 140 and a second ring 141 connected to it. The motor housing part has a third ring 441. The second flange 140 and the second ring 141 together form a cross-sectional T shape. Four sealing areas are provided. The first sealing area is located in the first housing part 103 on the radial outer side of the first ring 131. The second sealing area 144 is located opposite, on the radial inner side of the second ring 141 and the second housing part 104. Similarly, there is a third sealing area located radially on the inner side of second ring 141 and the second housing part 104. The fourth sealing area is located opposite, on the radial outer side of the third ring 441 and the motor housing part 44. The second housing part 104 consists of a material that allows a laser beam of a certain wavelength or a wavelength range to pass through it. The first housing part 103 and the motor housing part 44 are made of a material that absorbs the same laser beam. This way a laser beam is guided to a seam without heating the transparent material. There the beam encounters material that absorbs the light and converts it into heat, which melts the plastic and establishes an inner connection with the neighboring material.

As the two sealing areas to be welded are close to each other, it is not difficult to undertake the two sealing actions with one device and in one operation. The welding device can have two individual lasers so that each laser beam can create one seam, or it can have just one laser, the output beam of which is divided into two sections with the help of a splitter, each of which then creates one welded seam. In the example cited here, the laser rays are guided radially to the pump housing.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A permanent magnet rotor for use in a motor having a stator, the rotor comprising:
   a shaft with a periphery;
   a hollow cylindrical permanent magnet;
   an elastic connecting medium between the shaft and the permanent magnet, wherein the permanent magnet is arranged co-axially around the shaft and the elastic connecting medium is arranged in several first areas along the periphery of the shaft, in which the distance between the shaft and the permanent magnet is a first distance, which is separated from second areas in which the distance between the shaft and the permanent magnet is a second distance that is smaller than the first distance and greater than zero and wherein the second areas are dimensioned in such a way that a small longitudinal expansion compensation of the shaft material is possible as compared to the permanent magnet material, but a large deflection of the permanent magnet in relation to the stator is prevented.

2. The permanent magnet rotor according to claim 1, wherein the connecting medium is an elastic adhesive.

3. The permanent magnet rotor according to claim 1, wherein the shaft is hollow and the rotor further comprises an axle positioned within the hollow of the shaft and wherein the elastic connecting medium is arranged in several grooves parallel to the axle, the grooves being defined along the periphery of the shaft.

4. The permanent magnet rotor according to claim 3, further comprising an impeller having a predetermined number of wings, the impeller being connected to the shaft, wherein the number of grooves is not equal to the number of wings of the impeller.

5. The permanent magnet rotor according to claim 3, wherein the grooves are distributed over the periphery of the shaft at equal distances.

6. The permanent magnet rotor according to claim 1, wherein the elastic connecting medium is arranged around the shaft in meander-shaped or spiral-shaped grooves.

7. The permanent magnet rotor according to claim 1, wherein the elastic connecting medium is distributed over the entire length of the permanent magnet.

8. The permanent magnet rotor according to claim 1, wherein the shaft is made of an injection molded plastic material.

9. The permanent magnet rotor according to claim 3, further comprises a locating bearing for locating the shaft relative to the axle.

10. The permanent magnet rotor according to claim 9, wherein the locating bearing consists of a plastic material that can be injection molded, and that is joined to the permanent magnet rotor.

11. The permanent magnet rotor according to claim 10, wherein the locating bearing is provided with filling material that improves the sliding capacity of the bearing.

12. A process of manufacturing a permanent magnet rotor according to claim 10, wherein the locating bearing and the shaft are manufactured in a two-component injection molding process in which the locating bearing and the shaft are made of different plastic components.

13. An electric motor comprising:
a coiled stator; a shaft with a periphery;
a hollow cylindrical permanent magnet; and an elastic connecting medium between the shaft and the permanent magnet,
wherein the permanent magnet is arranged co-axially around the shaft and the elastic connecting medium is arranged in several first areas along the periphery of the shaft, in which the distance between the shaft and the permanent magnet is a first distance, which is separated from second areas in which the distance between the shaft and the permanent magnet is a second distance that is smaller than the first distance and greater than zero; and
wherein the second areas are dimensioned in such a way that a small longitudinal expansion compensation of the shaft material is possible as compared to the permanent magnet material, but an undesirably large deflection of the permanent magnet in relation to the stator is prevented.

14. The electric motor according to claim 13, wherein there is an air gap length (L) between the permanent magnet rotor and the stator, and there is a minimum distance (A) between the shaft and the permanent magnet, and wherein the ratio (L/A) of the air gap length to the minimum distance is more than 1.

15. The electric motor according to claim 13, wherein the permanent magnet has a first radial magnetization, the magnetic field of which works in tandem with a stator magnetic field, and a second magnetization that cooperates with a stator-roof magnet sensor.

16. A centrifugal pump comprising:
a coiled stator; a shaft with a periphery;
a pump impeller coordinated with the shaft;
a hollow cylindrical permanent magnet; and
an elastic connecting medium between the shaft and the permanent magnet,
wherein the permanent magnet is arranged co-axially around the shaft and the elastic connecting the medium is arranged in several first areas alone the periphery of the shaft, in which the distance between the shaft and the permanent magnet is a first distance, which is separated from second areas in which the distance between the shaft and the permanent magnet is a second distance that is smaller than the first distance and greater than zero; and
wherein the second areas are dimensioned in such a way that a small longitudinal expansion compensation of the shaft material is possible as compared to the permanent magnet material, but an undesirably large deflection of the permanent magnet in relation to the stator is prevented.

17. The centrifugal pump according to claim 16, wherein the shaft and the pump impeller from a single unit.

18. The centrifugal pump according to claim 16, wherein a longitudinal groove is arranged between the axle and the shaft which longitudinal groove serves as a channel for a secondary liquid circulation for cooling a coil of the coiled stator.

* * * * *